(12) United States Patent
Blount et al.

(10) Patent No.: US 7,496,585 B2
(45) Date of Patent: Feb. 24, 2009

(54) METHODS AND APPARATUS FOR DISCOVERING DATA PROVIDERS SATISFYING PROVIDER QUERIES

(75) Inventors: Marion Lee Blount, Mahopac, NY (US); Paul C. Castro, White Plains, NY (US); Norman Howard Cohen, Suffern, NY (US); John S. Davis, II, New York, NY (US); Maria Rene Ebling, White Plains, NY (US); Barry Leiba, Cortlandt Manor, NY (US); Archan Misra, Irvington, NY (US); Apratim Purakayastha, Yorktown Heights, NY (US); Wolfgang H. Segmuller, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/830,794

(22) Filed: Apr. 23, 2004

(65) Prior Publication Data

US 2005/0240551 A1    Oct. 27, 2005

(51) Int. Cl.
*G06F 7/00* (2006.01)
*G06F 17/30* (2006.01)
*G06F 17/00* (2006.01)

(52) U.S. Cl. .......................... 707/101; 707/2

(58) Field of Classification Search .................. 707/1–4, 707/100–102, 104.1, 10; 709/217, 219, 223, 709/227; 715/716, 742
See application file for complete search history.

(56) References Cited

U.S. PATENT DOCUMENTS

| | | | |
|---|---|---|---|
| 6,085,188 A | 7/2000 | Bachmann et al. | |
| 6,167,449 A | 12/2000 | Arnold et al. | |
| 6,446,108 B1 | 9/2002 | Rosenberg et al. | |
| 6,560,591 B1 * | 5/2003 | Memmott et al. | 707/1 |
| 6,580,916 B1 | 6/2003 | Weisshaar et al. | |
| 6,604,127 B2 | 8/2003 | Murphy et al. | |
| 7,337,191 B2 * | 2/2008 | Haeberle et al. | 707/104.1 |

(Continued)

OTHER PUBLICATIONS

1. W. Adjie-Winoto et al., "The Design and Implementation of an Intentional Naming System," Proceedings of the 17th ACM Symposium on Operating Systems Principles (SOSP '99), pp. 186-201, Dec. 1999.

(Continued)

*Primary Examiner*—Don Wong
*Assistant Examiner*—Merilyn P Nguyen
(74) *Attorney, Agent, or Firm*—Anne V. Dougherty; Ryan, Mason & Lewis, LLP

(57) ABSTRACT

Improved discovery techniques are provided. For example, in one aspect of the invention, a technique for making providers of a particular kind of data available to an application program includes the following steps/operations. The technique discovers whether one or more data providers are capable of providing the particular kind of data, wherein a discovered data provider is either a connected data provider or a virtual data provider. When a data provider capable of providing the particular kind of data is discovered and the discovered data provider is a virtual data provider, the technique instantiates the virtual data provider. When a data provider capable of providing the particular kind of data is discovered, the technique makes a data-provider handle for the discovered data provider available to the application program, with a common interface.

24 Claims, 4 Drawing Sheets

U.S. PATENT DOCUMENTS

| | | | |
|---|---|---|---|
| 2002/0052966 | A1 | 5/2002 | Isomura et al. |
| 2002/0067370 | A1* | 6/2002 | Forney et al. ............... 345/742 |
| 2002/0092000 | A1 | 7/2002 | Srinivasan et al. |
| 2002/0133504 | A1 | 9/2002 | Vlahos et al. |
| 2002/0174117 | A1 | 11/2002 | Nykanen |
| 2003/0101170 | A1 | 5/2003 | Edelstein et al. |
| 2003/0105846 | A1 | 6/2003 | Zhao et al. |
| 2003/0154305 | A1 | 8/2003 | Bethmangalkar et al. |
| 2003/0187841 | A1 | 10/2003 | Zhang et al. |
| 2003/0191802 | A1 | 10/2003 | Zhao et al. |
| 2003/0225931 | A1 | 12/2003 | Cheon et al. |
| 2004/0143810 | A1* | 7/2004 | Ahmed et al. ............... 717/100 |

OTHER PUBLICATIONS

2. T. Bellwood et al., UDDI Version 3.0.1, UDDI Spec Technical Committee Specification, http://uddi.org/pubs/uddi_v3.htm, pp. 1-383, Oct. 2003.

3. S.E. Czerwinski et al., "An Architecture for a Secure Service Discovery Service," Proceedings of the Fifth Annual ACM/IEEE International Conference on Mobile Computing and Networking(MobiCom '99), pp. 1-12, Aug. 1999.

4. E. Guttman et al., "Service Location Protocol," Version 2, RFC 2608, http://www.ietf.org/rfc/rfc2608.txt, pp. 1-54, Jun. 1999.

5. Sun Microsystems, Jini™ Technology Core Platform Specification, Version 2.0, http://wwws.sun.com/software/jini/specs, pp. 1-152, Jun. 2003.

6. M. Wahl et al., "Lightweight Directory Access Protocol (v3)," IETF RFC 2251, http://www.ietf.org/rfc/rfc2251.txt, pp. 1-50, Dec. 1997.

7. G. Wiederhold, "Mediators in the Architecture of Future Information Systems," IEEE Computer, vol. 25, No. 3, pp. 1-36, Mar. 1992.

* cited by examiner

METHODS AND APPARATUS FOR DISCOVERING DATA PROVIDERS SATISFYING PROVIDER QUERIES

FIELD OF THE INVENTION

The present invention relates to discovery techniques for use in accordance with computing systems and, more particularly, to techniques for making data providers satisfying queries available to an application program through a common interface, wherein data providers may include, for example, connected data providers and virtual data providers.

BACKGROUND OF THE INVENTION

It is known that in computing systems (e.g., distributed computing networks having client machines and server machines), various and interesting sources of data (e.g., sensor data and context data) and associated services are becoming increasingly available from network-connected data providers.

Previous approaches for discovering network services are known to include the Lightweight Directory Access Protocol (LDAP), Jini (a Java network technology from Sun Microsystems), Universal Description, Discovery and Integration (UDDI), the Service Location Protocol (SLP), the Ninja Service Discovery Service (SDS), and the Intentional Naming Service (INS). Further, there are a number of approaches that may provide a uniform interface or protocol for discovering services but which use a discovered service according to the protocol of the discovered service.

Accordingly, there is a need for improved computing system-based techniques for discovering data and services and for generating and transmitting data such that a data requester may receive data that is relevant for its queries.

SUMMARY OF THE INVENTION

Principles of the present invention provide improved discovery techniques. More particularly, computing system-based techniques for discovering data providers are provided such that a data requestor may receive data and services that are relevant to its queries.

In one aspect of the invention, a technique for making providers of a particular kind of data available to an application program includes the following steps/operations. The technique discovers whether one or more data providers are capable of providing the particular kind of data, wherein a discovered data provider is either a connected data provider or a virtual data provider. When a data provider capable of providing the particular kind of data is discovered and the discovered data provider is a virtual data provider, the technique instantiates the virtual data provider. When a data provider capable of providing the particular kind of data is discovered, the technique makes a data-provider handle for the discovered data provider available to the application program, with a common interface.

Further, the data provider discovering step/operation may further include discovering whether a data provider is also capable of satisfying one or more particular constraints. The data provider instantiating step/operation may further include discovery and instantiation of one or more other data providers to provide input data to the instantiated data provider. A connected data provider may be discoverable in a repository. The connected data provider repository may be capable of including a passive data provider, an active data provider, and a hybrid data provider. A virtual data provider may be discoverable in a repository. The virtual data provider repository may be capable of including a passive data provider, an active data provider, and a hybrid data provider.

Still further, the common interface may include a method to retrieve a current value of a given data provider and a method to subscribe to a notification that the given data provider has generated a new value. The step/operation of making a data-provider handle for the discovered data provider available to the application program may further include selecting an adapter for the discovered data provider from an adaptor repository. A connected data provider may include at least one of a sensor, a web service, a database, a message broker, and an instant-messaging system. Data providers may be distributed over at least one of a local-area network, a wide-area network, a cellular network, a serial connection, a universal serial bus (USB) connection, and a parallel connection.

For example, in one illustrative embodiment of the invention, a data-provider-discovery system accepts provider queries from an application program and responds with data providers satisfying the queries. A data provider may be a connected data provider or a virtual data provider. The same universal (common) interface may be used to obtain data from any data provider. A query processor has access to a repository of connected data providers and a repository of virtual data providers, and processes a query by searching both repositories for data providers satisfying the query. Before a virtual data provider is included in the query processor's response, it is instantiated, which may entail invoking the query processor recursively with each query corresponding to one of the virtual data provider's sources of input, and using a data provider returned by the recursive invocation for that source of the virtual data provider's input.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
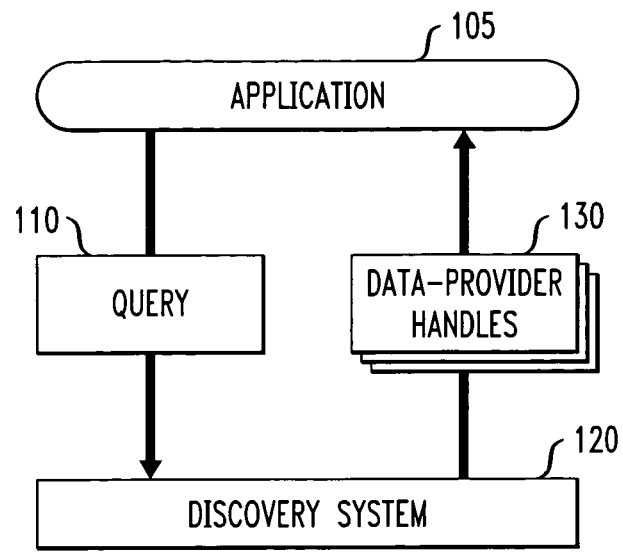
FIG. 1 is a block diagram illustrating a data-provider-discovery system, according to an embodiment of the present invention.

It is to be understood that while the present invention will be described below in the context of a distributed computing network, the invention is not so limited. Rather, the invention is more generally applicable to any computing environment in which it would be desirable to efficiently and effectively discover data providers such that a data requestor may receive data and services that are relevant to its queries.

Advantageously, a data-provider-discovery system is provided that is based on a uniform notion of a data provider. The data-provider-discovery system may accept provider queries from an application program, specifying the kind of data that the application program requires and the constraints that the application program imposes on providers of such data. The data-provider-discovery system may respond by making providers of the specified kind (or type) of data, satisfying the specified constraints, available to the application program.

Some examples of kinds of data and constraints are as follows. One kind of data could be the current temperature in degrees Celsius, and a corresponding constraint would be that the temperature is measured at a specified location and is accurate with 95% probability to within plus or minus two degrees. A second kind of data could be a current stock price in dollars, and a corresponding constraint would be that the price is for a stock with a specified symbol and that the price is based on a trade that took place no more than 20 minutes earlier. A third kind of data could be the current activities of an employee of a particular corporation, and a corresponding constraint would be that the employee has a specified serial number.

In one illustrative embodiment, there are two operations for obtaining data from a data provider that the data-provider-discovery system has made available to the application program. First, a data provider accepts requests for its current value, and responds with that value. Second, a data provider accepts subscription requests for notifications that it has generated a new value, and provides such notifications to subscribers when it generates a new value.

Values may be represented in a self-descriptive polymorphic representation such as the eXtensible Markup Language (XML). XML documents are widely accepted by various processing programs and data exchange systems, wherein the data in the XML document is used directly or transformed into a data structure used by the receiving program or system.

Thus, in accordance with the invention, data providers make their values available through the same universal interface. A data provider implementing this interface may be a connected data provider (also referred to as an actual data provider) or a virtual data provider, as will be explained in further detail below.

Connected data providers include, but are not limited to, sensors, web services, databases, message brokers, and instant-messaging systems. Mechanisms by which a connected data provider may be connected to the data-provider-discovery system include, but are not limited to, a local-area network, a wide-area network (e.g., Internet or World Wide Web), a cellular network, a serial connection, a USB (universal serial bus) connection, or a parallel connection.

In one illustrative embodiment, the data-provider-discovery system communicates with a connected data provider through an adapter that implements the universal data-provider interface using internal mechanisms specific to that data provider. A database and a request-response web service are examples of passive data providers, which deliver values in response to requests. Request-callback web services, and certain sensors, are examples of active data providers, which take the initiative in emitting new values. The techniques of the invention can also involve hybrid data providers, that take the initiative in emitting new values, but also respond to requests for their current value. The universal data-provider interface would require even a purely passive data provider to accept subscription requests for notifications that it has generated a new value, even though no such notifications will ever be issued. Similarly, the interface would require even a purely active data provider to respond to requests for its current value. For this purpose, the current value is defined to be the last value that the data provider emitted.

A virtual data provider is a software object that receives input data from some number (zero or more) of other data providers (either connected or virtual) and performs a computation that determines the current value of the virtual data provider. A virtual data provider contains a query corresponding to each source of input data it uses, specifying the kind of data the virtual data provider requires for that source and constraints that the provider of that data must satisfy. The form of this query may be identical to the form of the provider query that an application program issues to the data-provider-discovery system. Like a connected data provider, a virtual data provider may be active, passive, or hybrid. In an active data provider, the arrival of input data or the arrival of a certain point in time may trigger the emission of a new value. A request for the current value of a passive data provider may cause the passive data provider to request the current values of the data providers from which it is obtaining its input data.

The data-provider-discovery system may include a query processor that accepts queries and responds with data providers satisfying those queries. The query processor may use a repository of connected data providers and a repository of virtual data providers. The query processor processes a query by searching both repositories for data providers satisfying the query.

Before a virtual data provider is included in the query processor's response, it is instantiated. Instantiation of a virtual data provider may entail invoking the query processor recursively with each query corresponding to one of the virtual data provider's sources of input, and using a data provider returned by the recursive invocation for that source of the virtual data provider's input. The recursive invocations resulting directly and indirectly from the submission of an application-program query to the query processor cause a tree of data providers to grow, in which the leaves are connected data providers and all other nodes are virtual data providers.

Accordingly, a data-provider-discovery system of the invention provides many advantages. By way of example, the system provides solutions to problems associated with the fact that data formats, protocols and interfaces of existing data providers may vary widely, and the fact that the set of available network-connected data providers, and their properties, including quality of service and quality of information, may fluctuate rapidly. The system provides one registry for all data providers of interest in a given application domain or a given enterprise.

Further, a data-provider-discovery system of the invention realizes and addresses the fact that there may be many choices of data providers from which to choose, and it may be difficult for an application to make an intelligent choice. The system also realizes and addresses the fact that many network-connected data providers are unreliable, so applications must be prepared to deal with the failure of such providers, for example, by replacing a failed provider with another provider of the same kind of data. Also, as mentioned above, the system realizes that some data to be provided to applications might be available from virtual data providers (e.g., programmable entities that compute needed high-level data from available low-level data) rather than, or in addition to, actual data providers.

Referring now to FIG. 1, a block diagram illustrates a data-provider-discovery system, according to an embodiment of the present invention. More particularly, FIG. 1 also illustrates the context of the present invention.

An application 105 generates a query 110 for providers of a particular kind of data. By way of example, the application could be a servlet constructing a web page with a map showing the temperature in selected cities. A simple version of this application would construct a new map in response to each servlet request by requesting current temperature data for each selected city. A more efficient version of this application would maintain a current version of the map in a cache, subscribe to notifications that the temperature in one of the selected cities has changed, incrementally update the map upon receiving such notifications, and return the cached map in response to servlet requests. Another application could be a program to automatically execute an online trade to sell a particular stock when the price of that stock hits a certain threshold value. The application would subscribe to notifications of trade in that stock. Another application could display a "buddy list" of instant-messaging partners, together with short descriptions of each partner's current activity. The application would request each partner's current activity upon receiving notification that that partner is online, and would also subscribe to notifications that the current activity of a particular partner has changed.

Query 110 is delivered to a discovery system 120, which responds with some number of data-provider handles 130, each providing access to the data provided by a data provider satisfying the query. Providers of data may include passive data providers that respond to requests for a value, active data providers that generate values of their own initiative, and hybrid data providers that do both.

Rather than naming specific data providers, the query describes the kind of data that is needed (or desired), and constraints that a provider of such data is to obey. A data provider handle provides a common interface through which an application may access the data provided by any data provider. In one embodiment, this interface has the form illustrated in FIG. 2.

Figure 2:
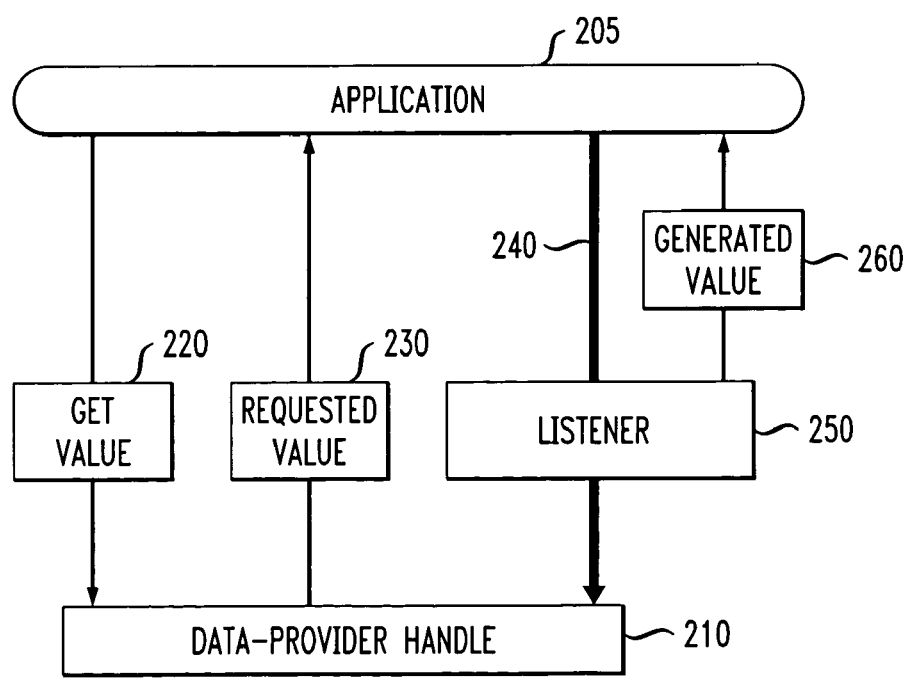
FIG. 2 is a block diagram illustrating a universal interface by which an application program may obtain values from a data-provider handle, according to an embodiment of the present invention.

Referring now to FIG. 2, a block diagram illustrates a universal interface by which an application program 205 may obtain values from a data-provider handle, according to an embodiment of the present invention. It is to be appreciated that a data-provider handle is a software object, for example, a Java object, that implements the universal data-provider interface for a particular data provider. In particular, the handle may have a method for requesting the current value of that particular data provider and a method for subscribing to notifications that that particular data provider has generated a new value.

As shown, a data-provider handle 210 may accept a get-value request 220 from an application, in which case the handle responds with a requested value 230. In addition, the data-provider handle may accept a subscription request 240 in which a listener module 250 is passed to the data-provider handle. Whenever the corresponding data provider issues a new value, the listener receives a notification 260 that a new value has been generated. In the case of the weather-map application, the values are temperatures. In the case of the stock-trade application, the values are stock prices. In the case of the buddy-list application, the values are brief textual descriptions of a person's current activities.

Figure 3:
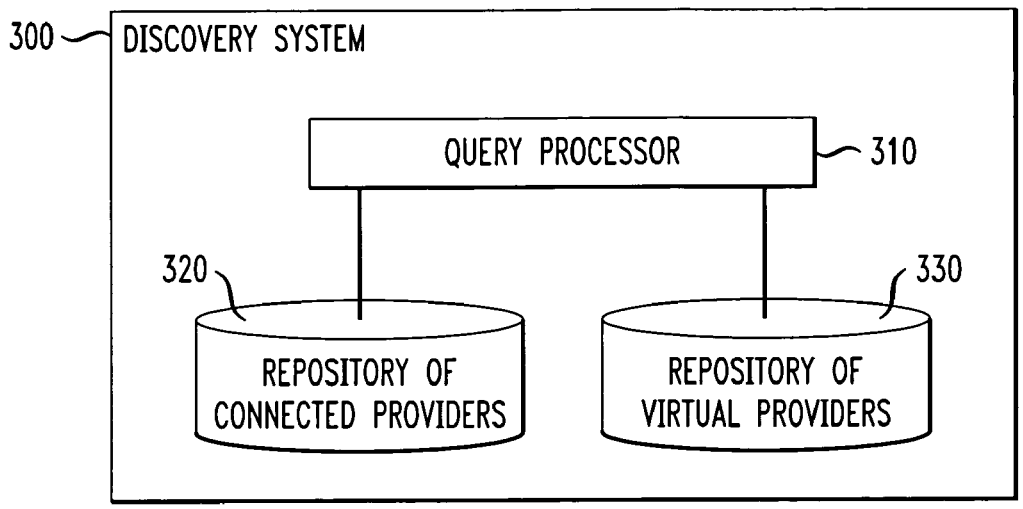
FIG. 3 is a block diagram illustrating an internal structure of a data-provider-discovery system, according to an embodiment of the present invention.

Referring now to FIG. 3, a block diagram illustrates an internal structure of a data-provider-discovery system, according to an embodiment of the present invention. As shown, internal architecture 300 of a data-provider-discovery system includes a query processor 310, a repository of connected providers 320, and a repository of virtual providers 330. It is to be appreciated that the repositories form a data provider registry.

Principles of the present invention encompass a wide variety of connected providers including, but not limited to, sensors, web services, databases, message brokers, and instant-messaging systems. A web service that responds with driving directions given a request specifying an origin and a destination is an example of a passive data provider. An RFID (radio frequency identification) tag reader that issues a message containing the ID of each tag it reads is an example of an active data provider. A connected data provider may be connected to the discovery system by a variety of mechanisms including, but not limited to, a computer network, a telephonic network, a serial connection, a parallel connection, or a USB (universal serial bus) connection.

A virtual data provider is a programmable entity that can act as a passive, active or hybrid data provider. It receives inputs from other data providers, either connected or virtual, and performs computations to determine the values with which it responds to requests and the values that it generates on its own initiative. In one embodiment, the behavior of a virtual data provider is specified by an expression in which certain terms contain provider queries and represent values obtained from other data providers satisfying those queries. The computations performed by a virtual data provider may include, among other operations, arithmetic and logical operations, filtering operations, aggregating operations, and operations that recognize patterns of events.

Figure 4:
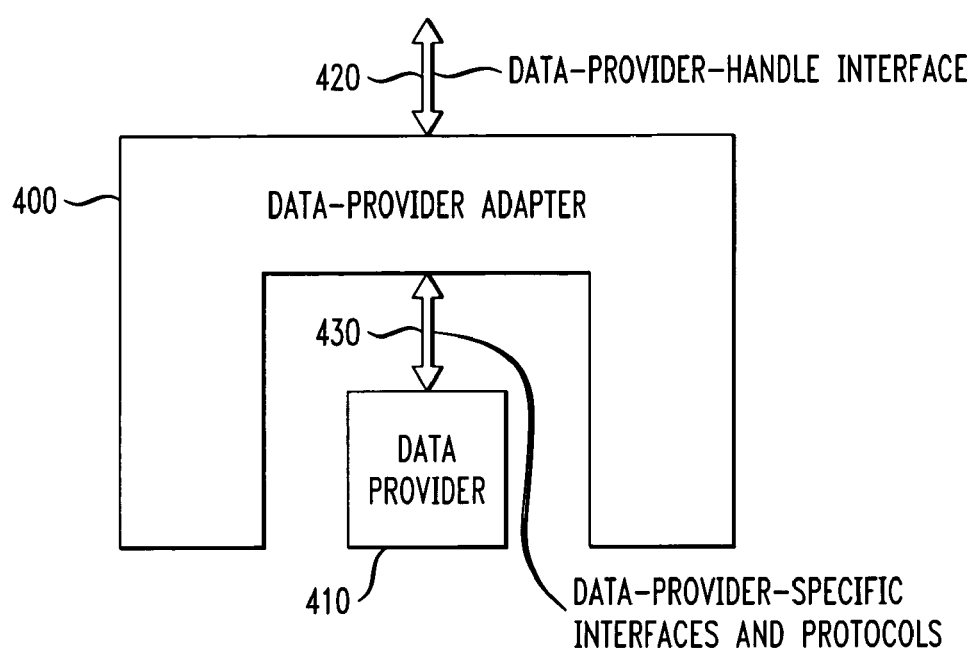
FIG. 4 is a block diagram illustrating a data-provider adapter, according to an embodiment of the present invention.

For each connected provider, there is a corresponding software module called a provider adapter. FIG. 4 is a block diagram illustrating a data-provider adapter, according to an embodiment of the present invention. As FIG. 4 illustrates, a data-provider adapter 400 encapsulates a data provider 410, presenting it to the outside world through the data-provider-handle interface 420 that was depicted in FIG. 2. The data-provider adapter communicates with the data provider using the interfaces and protocols 430 of that particular data provider.

An adapter for a data provider that publishes messages to a Java Message Service (JMS) topic might work as follows. The handler for an arriving message would construct a value corresponding to the contents of the message, issue notifications to all subscribers to new-value notifications that the data provider has generated the constructed value, and save the value. A method corresponding to requests for the current value of the data provider would return the most recently saved value.

In an adapter for a passive temperature sensor, the method corresponding to requests for the current value of the data provider might perform a memory-mapped read from a specified hardware address, and return the value thus obtained. The adapter would accept subscriptions for new-value notifications, but would never issue notifications to subscribers.

Figure 5:
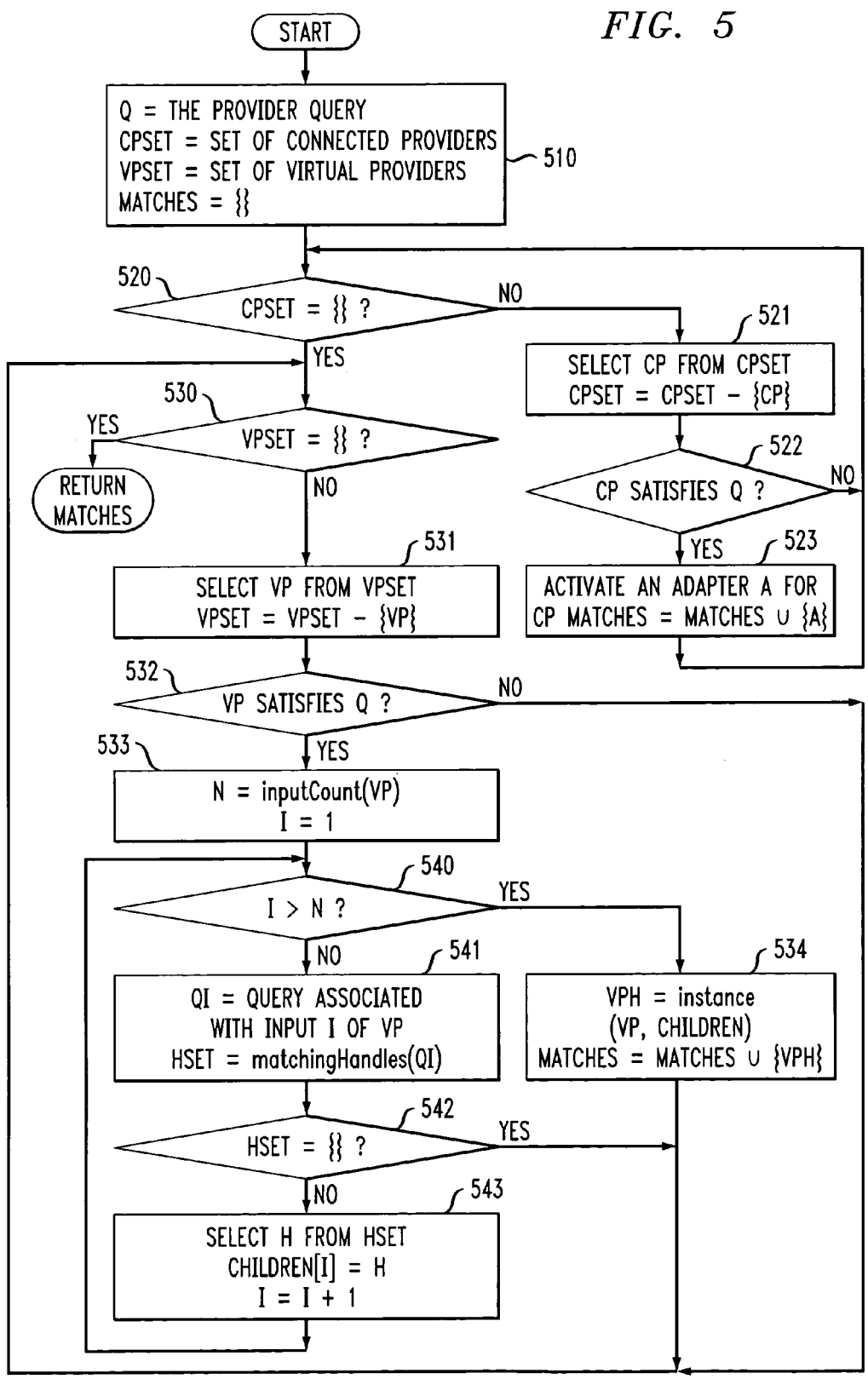
FIG. 5 is a flow diagram illustrating a process for obtaining a set of data providers matching a provider query, according to an embodiment of the present invention.

Referring now to FIG. 5, a flow diagram illustrates a process for obtaining a set of data providers matching a provider query, according to an embodiment of the present invention. More particularly, FIG. 5 is a flowchart illustrating a procedure "matchingHandles" by which a data-provider-discovery system obtains a set of data-provider handles satisfying a given provider query.

As shown, the flowchart contains an initialization step 510, a first outer loop, a second outer loop, and a return step 511. Each iteration of the first outer loop includes steps 520, 521, 522, and 523. An iteration of the second outer loop may include steps 530, 531, 532, 533, an inner loop, and step 534. An iteration of the inner loop includes steps 540, 541, 542, and 543.

The initialization step 510 sets Q to the given provider query, CPSET to the set of connected providers in the connected-provider registry, VPSET to the set of virtual providers in the virtual-provider registry, and MATCHES to the empty set. The first outer loop begins with a test 520 that checks whether CPSET is empty, and exits the first outer loop if so. If not, the first outer loop continues with a step 521 that selects an arbitrary connected data provider CP from CPSET and removes CP from CPSET.

Step 522 tests whether CP satisfies Q, and if it does, step 523 activates a data-provider adapter A for CP and adds A to the set MATCHES. MATCHES is a set of data-provider handles. The adapter A may be retrieved from a repository of data-provider adapters. It is to be appreciated that a data-provider adapter can be used as a data-provider handle since the adapter presents the data-provider-handle interface to the outside world. This concludes the iteration of the first outer loop.

Upon exit from the first outer loop, the second outer loop begins with a test 530 that checks whether VPSET is empty, and exits the second outer loop if so. If not, the second outer loop continues with a step 531 that selects an arbitrary virtual data provider VP from VPSET and removes VP from VPSET. Step 532 performs a test that checks whether VP satisfies Q and, if not, skips to the end of the iteration of the second outer loop. Step 533 sets N to the number of data-provider inputs from which virtual data provider VP obtains its data and initializes the inner-loop loop counter I to 1.

Step 533 is followed by the inner loop, which begins with a test 540 that checks whether I is greater than N and exits the inner loop normally if so. The iteration of the outer loop continues with a step 541 that sets QI to the query in VP associated with the $I^{th}$ data-provider input of VP, then recursively invokes matchingHandles (the procedure corresponding to the entire flowchart of FIG. 5) to obtain a set HSET of data-provider handles satisfying QI.

Step 542 tests whether HSET is empty and, if so, breaks out of the inner loop and skips to the end of the current iteration of the second outer loop. Otherwise, the iteration of the inner loop ends with a step 543 that selects an arbitrary data-provider handle H from HSET, stores it in an array element CHILDREN[I], and increments the loop counter I.

Following normal exit from the inner loop, an iteration of the second outer loop resumes with step 534, which creates a provider handle VPH corresponding to an instance of VP in which the handles in array elements CHILDREN[1], . . . ,CHILDREN[N] are bound to the N data-provider inputs of VP, and adds VPH to the set MATCHES. This completes an iteration of the second outer loop.

Figure 6:
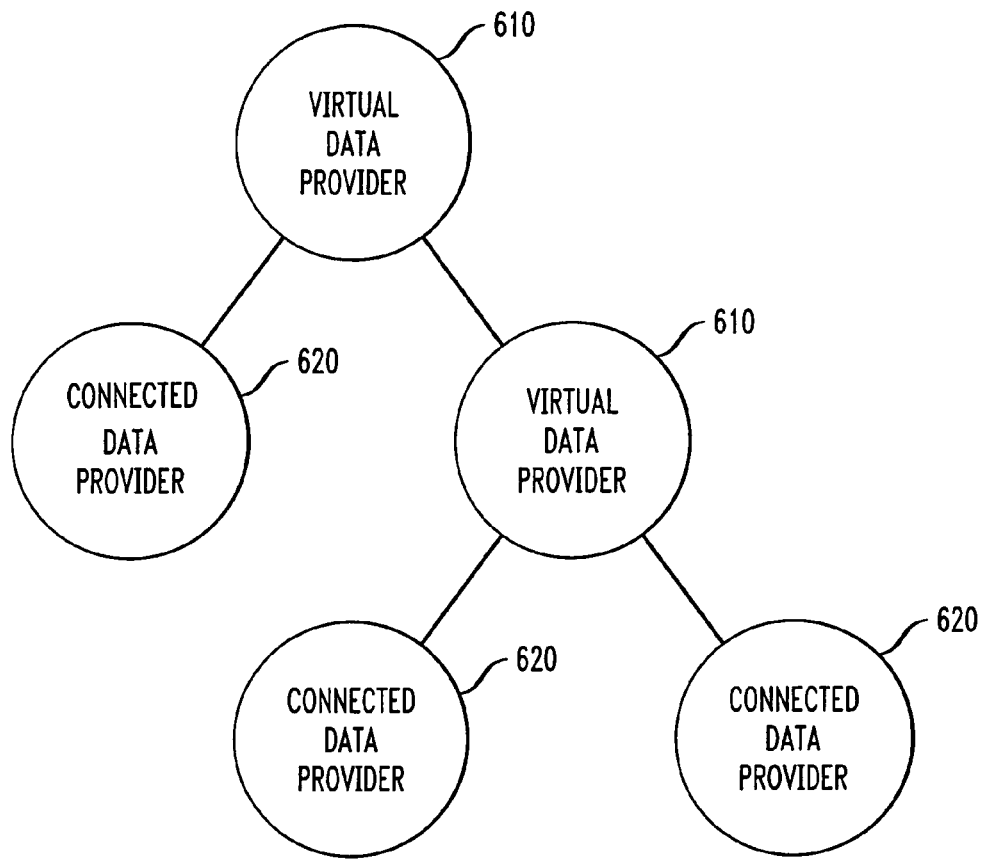
FIG. 6 is a diagram illustrating a tree of data providers, according to an embodiment of the present invention.

Following exit from the second outer loop, step 511 returns the set of data-provider handles MATCHES. The recursive invocation of matchingHandles in step 541 can lead to the generation of a tree of data providers such as that illustrated in FIG. 6, in which each leaf 620 is a connected data provider and each internal node 610 is a virtual data provider whose data-provider inputs are supplied by the data providers corresponding to the children of that node. Principles of the invention also encompass the concept of "memoizing" the results of calls on matchingHandles, resulting in a directed acyclic graph in which a given data provider supplies inputs of more than one virtual data provider.

Principles of the invention encompass enhancements to this procedure, in which it is unnecessary to examine each connected provider in the registry of connected providers or each virtual provider in the registry of virtual providers. For example, sets of providers might be partitioned into sets that can be selected using attributes of the provider query. Similarly, principles of the invention may include replacing the arbitrary selection of data-provider handle H from HSET in temp 543 with a selection based on criteria such as, but not limited to, the quality of service or quality of information currently being provided by the data providers associated with the data-provider handles in HSET, or network latencies, or processor loads.

Principles of the invention also may include a variation in which a query tests properties of a data-provider handle that cannot be supplied until the data-provider handle has been activated (for example, a snapshot of the data provider's current value). In this variation, the test 522 for a connected provider satisfying a query before it is activated in step 523 is replaced by a test performed after the activation in step 523 but before the addition of an adapter to MATCHES in step 523. Also, the test 532 for a virtual provider satisfying a query before it is instantiated in step 534 is replaced by a test performed after the instantiation in step 534 but before the addition of the virtual-data-provider handle to MATCHES in step 534.

Principles of the invention also may include variations such as looking for a single data-provider handle satisfying a query and exiting the procedure as soon as it is found. Finally, methods well known to those skilled in the art of programming may be employed for eliminating recursive calls such as that in step 541.

Figure 7:
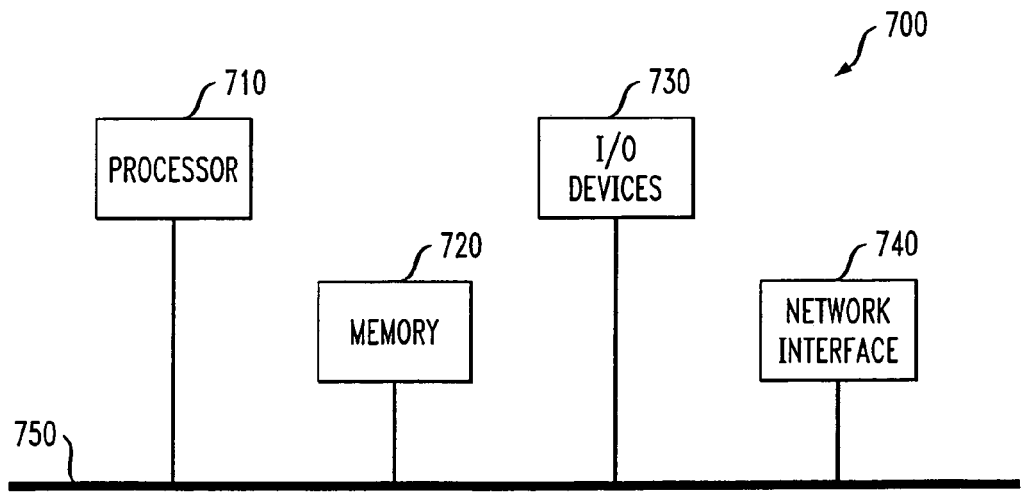
FIG. 7 is a block diagram illustrating a computer system suitable for implementing a data-provider-discovery system, according to an embodiment of the present invention.

Referring lastly to FIG. 7, a computer system suitable for implementing a data-provider-discovery system, according to an exemplary embodiment of the present invention, is illustrated. For example, the illustrative architecture of FIG. 7 may be used in implementing any and all of the components and/or steps described in the context of FIGS. 1 through 6.

As shown, the computer system 700 may be implemented in accordance with a processor 710, a memory 720, I/O devices 730, and a network interface 740, coupled via a computer bus 750 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

It is to be further appreciated that the present invention also includes techniques for providing data query services. By way of example, a service provider agrees (e.g., via a service level agreement or some informal agreement or arrangement) with a service customer or client to provide data query services. That is, by way of one example only, the service provider may host the customer's web site and associated applications. Then, in accordance with terms of the contract between the service provider and the service customer, the service provider provides data query services that may include one or more of the methodologies of the invention described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of making providers of a particular kind of data available to an application program, comprising the steps of:
discovering whether one or more data providers are configured to provide the particular kind of data;
when a data provider capable of providing the particular kind of data is discovered, determining whether the discovered data provider is either a connected data provider or a virtual data provider;
when a discovered data provider is determined to be a virtual data provider, instantiating the virtual data provider; and
when a data provider configured to provide the particular kind of data is discovered, whether the discovered data provider is a connected data provider or a virtual data provider, making a data-provider handle for the discovered data provider available to the application program with a common interface comprising a method to retrieve a current value of a given data provider and a method to subscribe to a notification that a given data provider has generated a new value; wherein the common interface is universal for the application program with respect to the one or more data providers whether the one or more data providers comprise active data providers, passive data providers, or hybrid data providers.

2. The method of claim 1, wherein the data provider discovering step further comprises discovering whether a data provider is also configured to satisfy one or more particular constraints.

3. The method of claim 1, wherein the data provider instantiating step comprises discovery and instantiation of one or more other data providers configured to provide input data to the instantiated data provider.

4. The method of claim 1, wherein a connected data provider is discoverable in a repository.

5. The method of claim 4, wherein the connected data provider repository is configured to comprise a passive data provider, an active data provider, and a hybrid data provider.

6. The method of claim 1, wherein a virtual data provider is discoverable in a repository.

7. The method of claim 6, wherein the virtual data provider repository is configured to comprise a passive data provider, an active data provider, and a hybrid data provider.

8. The method of claim 1, wherein the step of making a data-provider handle for the discovered data provider available to the application program further comprises selecting an adapter for the discovered data provider from an adaptor repository.

9. The method of claim 1, wherein a connected data provider comprises at least one of a sensor, a web service, a database, a message broker, and an instant-messaging system.

10. The method of claim 1, wherein data providers are distributed over at least one of a local-area network, a wide-area network, a cellular network, a serial connection, a universal serial bus (USB) connection, and a parallel connection.

11. The method of claim 1, wherein when a data provider configured to provide the particular kind of data is discovered and the discovered data provider is a virtual data provider, instantiating the virtual data provider.

12. The method of claim 1, wherein when a data provider configured to provide the particular kind of data is discovered and the discovered data provider is a connected data provider, connecting the connected data provider to a query processor.

13. Apparatus for making providers of a particular kind of data available to an application program, comprising:
a memory; and
at least one processor coupled to the memory and operative to: (i) discover whether one or more data providers are configured to provide the particular kind of data; (ii) when a data provider capable of providing the particular kind of data is discovered, determine whether the a discovered data provider is either a connected data provider or a virtual data provider; (iii) when a discovered data provider is determined to be a virtual data provider, instantiate the virtual data provider; and (iv) when a data provider configured to provide the particular kind of data is discovered, whether the discovered data provider is a connected data provider or a virtual data provider, make a data-provider handle for the discovered data provider available to the application program with a common interface comprising a method to retrieve a current value of a given data provider and a method to subscribe to a notification that a given data provider has generated a new value; wherein the common interface is universal for the application program with respect to the one or more data providers whether the one or more data providers comprise active data providers, passive data providers, or hybrid data providers.

14. The apparatus of claim 13, wherein the data provider discovering operation further comprises discovering whether a data provider is also configured to satisfy one or more particular constraints.

15. The apparatus of claim 13, wherein the operation of making a data-provider handle further comprises discovery and instantiation of one or more other data providers to provide input data to the discovered data provider.

16. The apparatus of claim 13, wherein a connected data provider is discoverable in a repository operatively coupled to the at least one processor.

17. The apparatus of claim 16, wherein the connected data provider repository is configured to comprise a passive data provider, an active data provider, and a hybrid data provider.

18. The apparatus of claim 13, wherein a virtual data provider is discoverable in a repository operatively coupled to the at least one processor.

19. The apparatus of claim 18, wherein the virtual data provider repository is configured to comprise a passive data provider, an active data provider, and a hybrid data provider.

20. The apparatus of claim 13, wherein the operation of making a data-provider handle for the discovered data provider available to the application program further comprises selecting an adapter for the discovered data provider from an adaptor repository.

21. The apparatus of claim 13, wherein a connected data provider comprises at least one of a sensor, a web service, a database, a message broker, and an instant-messaging system.

22. The apparatus of claim 13, wherein data providers are distributed over at least one of a local-area network, a wide-area network, a cellular network, a serial connection, a universal serial bus (USB) connection, and a parallel connection.

23. An article of manufacture for making providers of a particular kind of data available to an application program, comprising a machine readable storage medium containing one or more programs which when executed implement the steps of:

discovering whether one or more data providers are configured to provide the particular kind of data;

when a data provider capable of providing the particular kind of data is discovered, determining whether the discovered data provider is either a connected data provider or a virtual data provider;

when a discovered data provider is determined to be a virtual data provider, instantiating the virtual data provider; and when a data provider configured to provide the particular kind of data is discovered, whether the discovered data provider is a connected data provider or a virtual data provider, making a data-provider handle for the discovered data provider available to the application program with a common interface comprising a method to retrieve a current value of a given data provider and a method to subscribe to a notification that a given data provider has generated a new value; wherein the common interface is universal for the application program with respect to the one or more data providers whether the one or more data providers comprise active data providers, passive data providers, or hybrid data providers.

24. A method of providing a service for making providers of a particular kind of data available to an application program, comprising the step of:

a service provider, in response to a query associated with the application program, enabling the steps of: (i) discovering whether one or more data providers are configured to provide the particular kind of data; (iii) when a data provider capable of providing the particular kind of data is discovered, determining whether the discovered data provider is either a connected data provider or a virtual data provider; (iii) when a discovered data provider is determined to be a virtual data provider, instantiating the virtual data provider; and (iv) when a data provider configured to provide the particular kind of data is discovered, whether the discovered data provider is a connected data provider or a virtual data provider, make a data-provider handle for the discovered data provider available to the application program with a common interface comprising a method to retrieve a current value of a given data provider and a method to subscribe to a notification that a given data provider has generated a new value; wherein the common interface is universal for the application program with respect to the one or more data providers whether the one or more data providers comprise active data providers, passive data providers, or hybrid data providers.

* * * * *